US012766438B2

(12) United States Patent
Weng

(10) Patent No.: US 12,766,438 B2
(45) Date of Patent: Oct. 20, 2026

(54) REMOVAL METHOD OF CARBON DIOXIDE

(71) Applicant: NEW-FAST TECHNOLOGY CO., LTD., Hsinchu County (TW)

(72) Inventor: Fu-Chun Weng, Hsinchu County (TW)

(73) Assignee: NEW-FAST TECHNOLOGY CO., LTD., Hsinchu County (TW)

( * ) Notice: Subject to any disclaimer, the term of this patent is extended or adjusted under 35 U.S.C. 154(b) by 281 days.

(21) Appl. No.: 18/824,136

(22) Filed: Sep. 4, 2024

(65) Prior Publication Data

US 2025/0276258 A1 Sep. 4, 2025

(30) Foreign Application Priority Data

Feb. 29, 2024 (TW) ................................ 113107191

(51) Int. Cl.
*B01D 53/02* (2006.01)
*B01D 15/36* (2006.01)
*B01D 19/00* (2006.01)
*G01N 30/14* (2006.01)

(52) U.S. Cl.
CPC ....... *B01D 19/0031* (2013.01); *B01D 15/362* (2013.01); *B01D 15/363* (2013.01); *G01N 30/14* (2013.01); *G01N 2030/146* (2013.01)

(58) Field of Classification Search
CPC .......................... B01D 15/362; B01D 15/363; B01D 19/0031; G01N 2030/146; G01N 30/14; G01N 30/96; Y02C 20/40
See application file for complete search history.

(56) References Cited

U.S. PATENT DOCUMENTS 6,444,475 B1 * 9/2002 Anderson, Jr. ........ G01N 30/96 422/68.1
7,311,836 B2 * 12/2007 Kusunose ............ B01D 15/363 435/106
8,529,758 B2 * 9/2013 Riviello .................. C25B 15/08 210/656
11,332,391 B2 * 5/2022 Srinivasan ........... B01D 61/462
2006/0037911 A1 * 2/2006 Dasgupta ........... B01D 19/0031 210/259
2025/0276258 A1 * 9/2025 Weng ................... B01D 15/363
2026/0062490 A1 * 3/2026 Yang ....................... A61P 35/00

* cited by examiner

*Primary Examiner* — Christopher P Jones
(74) *Attorney, Agent, or Firm* — HDLS IPR SERVICES; Chun-Ming Shih

(57) ABSTRACT

A removal method of a carbon dioxide includes: loading a sample into the ion chromatography system; combining the sample with a liquid mobile phase to be an object under test, wherein the object under test includes a plurality of target anions and a plurality of cations; separating the target anions in the object under test into a plurality of groups; replacing the cations in the object under test with a plurality of hydrogen ions; creating a vacuum environment; transmitting the object under test to the vacuum environment; and removing a plurality of carbon dioxide molecules, a plurality of carbonic acid molecules, a plurality of bicarbonate ions, or a plurality of carbonate ions in the object under test to make a concentration of the carbonate ions and a concentration of the bicarbonate ions be equal to or less than about one part per billion.

11 Claims, 4 Drawing Sheets

REMOVAL METHOD OF CARBON DIOXIDE

BACKGROUND OF THE DISCLOSURE

Technical Field

The present disclosure relates to a removal method of a carbon dioxide, which is applied in a chromatography system.

Description of Related Art

Ion chromatography is an analytical technique that separates and detects different ions in aqueous solutions. The main steps are: importing the sample into the chromatography system; separating the target ions by the liquid mobile phase and the chromatographic system; reacting the sample through the action of an ion suppressor; and detecting and analyzing the target ions by a conductivity detector.

Ion chromatography technology is divided into a cation chromatography system and an anion chromatography system based on the polarity of the target ions after dissociation. An alkaline solution is generally used as the mobile phase in the anion chromatography system. Target anion chromatography is performed, by the anions in an alkaline mobile phase, to separate the target anions in the sample. Then, the cation exchange method is performed, by a cation suppressor, to replace all cations in the mobile phase with the hydrogen ions. Finally, the separated and suppressed sample is imported into the conductivity detector to detect the conductivity of the charged target anions in the mobile phase background. As a result, the qualitative and quantitative determination of the target anions may be achieved.

The carbonic acid in the alkaline mobile phase usually comes from the mobile phase containing carbonate or the carbon dioxide gas in the environment dissolving into the alkaline mobile phase. As a result, the background conductivity value of the analysis is increased, which is not conducive to the detection of the conductivity of the sample.

The carbonic acid in the sample solution usually comes from the carbon dioxide gas in the environment dissolving into the sample solution or the sample solution itself having the carbon dioxide.

The carbon dioxide reacts with the water to form the carbonic acid. The carbonic acid dissociates in the solution to form the carbonate ions and the bicarbonate ions. In the anion chromatography system, the carbonate ions and the bicarbonate ions may interfere with the conductivity detection capability and the detection accuracy of the target anions. In view of this, how to remove the carbon dioxide molecule, the carbonic acid molecule, the bicarbonate ions, and the carbonate ions is one of the current problems that need to be solved.

SUMMARY OF THE INVENTION

The present disclosure provides the removal method of a carbon dioxide cooperated with the ion chromatography system. The removal method of carbon dioxide may remove the carbon dioxide molecule, the carbonic acid molecule, the bicarbonate ions, and the carbonate ions in the alkaline mobile phase and the sample solution to make the detection sensibility of the ion chromatography system be able to detect the concentration of the target ions to about one part per billion (ppb).

The present disclosure provides a removal method of a carbon dioxide, cooperated with an ion chromatography system, the removal method including: loading a sample into the ion chromatography system; combining the sample with a liquid mobile phase to be an object under test, wherein the object under test includes a plurality of target anions and a plurality of cations; separating the target anions in the object under test into a plurality of groups; replacing the cations in the object under test with a plurality of hydrogen ions; creating a vacuum environment; transmitting the object under test to the vacuum environment; and removing a plurality of carbon dioxide molecules, a plurality of carbonic acid molecules, a plurality of bicarbonate ions, or a plurality of carbonate ions in the object under test to make a concentration of the carbonate ions and a concentration of the bicarbonate ions equal to or less than about one part per billion.

In some embodiments, the removal method further includes: creating the vacuum environment with a vacuum level of about 50 mmHg.

In some embodiments, the removal method further includes: under the vacuum environment with the vacuum level of about 50 mmHg, controlling a pumping flow rate to be equal to or less than about 10 standard cubic centimeters per minute.

In some embodiments, the removal method further includes: controlling an inlet flow rate to be equal to or less than about 10 standard cubic centimeters per minute.

In some embodiments, the removal method further includes: filtering a carbon dioxide gas flowing in due to the inlet flow rate.

In some embodiments, the removal method further includes: removing, by a gas-permeable membrane, a carbon dioxide gas from the object under test.

In some embodiments, the removal method further includes: when the gas-permeable membrane is damaged, preventing, by a buffer device, the object under test from flowing into a vacuum pump.

In some embodiments, the removal method further includes: when the pressure changes instantaneously, the buffer device reduces the instantaneous pressure difference to protect the gas-permeable membrane.

In some embodiments, the removal method further includes: measuring the vacuum level of the vacuum environment.

In some embodiments, the removal method further includes: adjusting a pumping flow rate based on a result of measuring the vacuum level of the vacuum environment.

In some embodiments, the removal method further includes: adjusting an inlet flow rate based on the result of measuring the vacuum level of the vacuum environment.

In some embodiments the removal method, further including: controlling, by a relay, a vacuum pump to be turned on and turned off.

In summary, the related-art of ion chromatography does not remove the carbon dioxide. Therefore, the related-art of ion chromatography may only detect solutions with the concentration of the target ions higher than 1 part per billion (ppb). In semiconductor factories, the extracted solutions under the contaminated ambient air may have a concentration lower than 1 ppb. In this case, the semiconductor manufacturing process may be seriously affected. Furthermore, since the carbon dioxide environmentally contributes to the object under test, the related-art of the ion chromatography may not analyze which anions contaminate the solution. The present disclosure provides the removal method of the carbon dioxide which may make the carbon dioxide molecule, the carbonic acid molecule, the bicarbonate ions, and the carbonate ions in the object under test be released by creating a vacuum environment and transmitting the object under test to the vacuum environment. The carbon dioxide gas may be removed from the object under test by a gas-permeable membrane. An inlet flow rate and a pumping flow rate may be controlled to be equal to or less than about 10 standard cubic centimeters per minute under the vacuum environment with the vacuum level of about 50 mmHg. As a result, the vacuum environment is stably created, and vibration is reduced to provide stable airflow for the carbon dioxide gas flowing in the vacuum environment, which may assist for taking away the carbon dioxide gas. The inflow carbon dioxide gas due to the inlet flow rate may be filtered. As a result, the inflow carbon dioxide gas to the vacuum environment is reduced, and the concentration of the carbon dioxide gas in the vacuum environment is stably controlled. The inlet flow rate may be adjusted based on the result of measuring the vacuum level of the vacuum environment to stably create the vacuum environment. When the gas-permeable membrane is damaged, the object under test may be prevented from flowing into a vacuum pump by a buffer device to avoid damage to the vacuum pump. When the pressure changes instantaneously, the buffer device may reduce the instantaneous pressure difference to protect the gas-permeable membrane. The vacuum pump may be controlled to be turned on and turned off by a relay to enhance operational convenience. The removal method of the carbon dioxide in the disclosure may make a concentration of the carbonate ions and a concentration of the bicarbonate ions be equal to or less than about one ppb. Therefore, when the ion chromatography system detects target ions with a concentration more than about one ppb, the target ions may be detected. The removal method of the carbon dioxide in the disclosure may be applied in semiconductor factories, chemical factories, equipment factories, environmental pollution, and other fields to provide precise chemical analysis.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
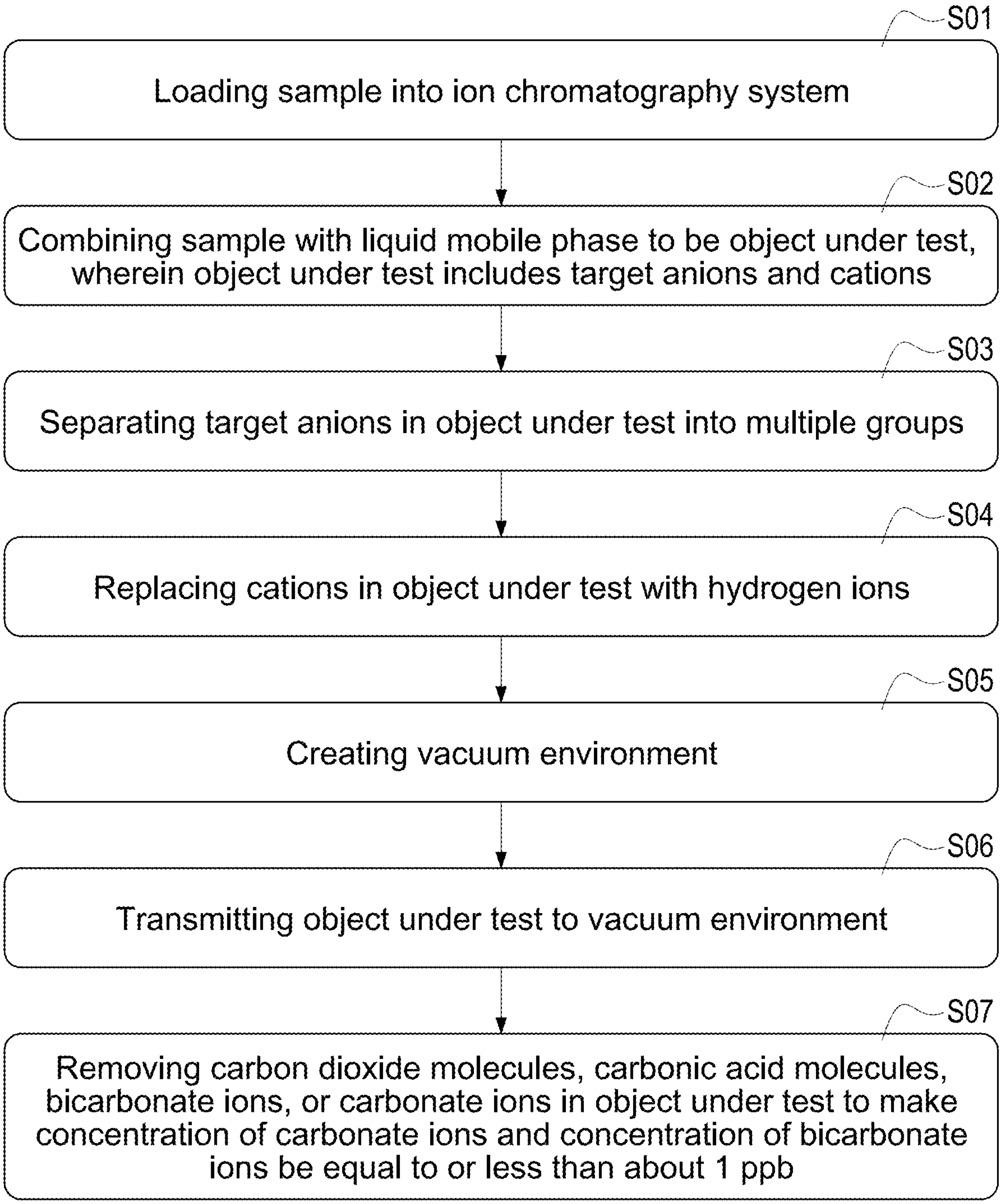
FIG. 1 is a block diagram of the removal method in accordance with an embodiment of the present disclosure.

FIG. 1 is a block diagram of the removal method in accordance with an embodiment of the present disclosure. Please refer to FIG. 1, the step S01 is loading a sample into the ion chromatography system; the step S02 is combining the sample with a liquid mobile phase to be an object under test, wherein the object under test comprises a plurality of target anions and a plurality of cations; the step S03 is separating the target anions in the object under test into a plurality of groups; the step S04 is replacing the cations in the object under test with a plurality of hydrogen ions; the step S05 is creating a vacuum environment; the step S06 is transmitting the object under test to the vacuum environment; the step S07 is removing a plurality of carbon dioxide molecules, a plurality of carbonic acid molecules, a plurality of bicarbonate ions, or a plurality of carbonate ions in the object under test to make a concentration of the carbonate ions and a concentration of the bicarbonate ions be equal to or less than about one ppb.

Figure 2:
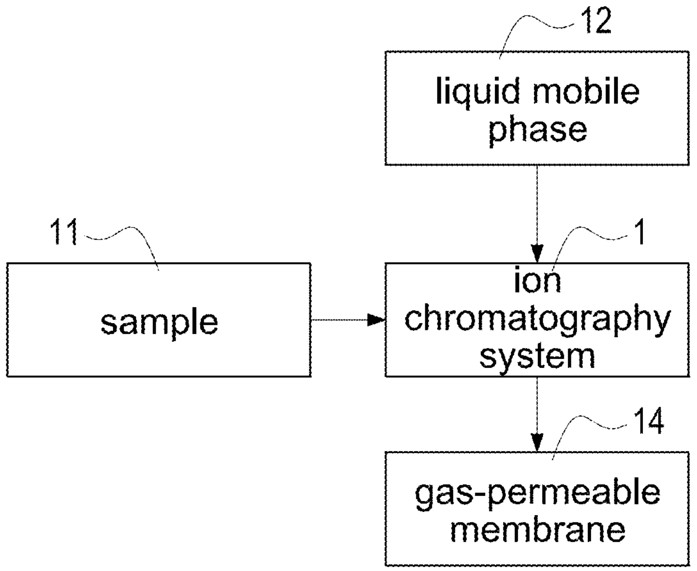
FIG. 2 is a schematic diagram of the ion chromatography system in accordance with an embodiment of the present disclosure.

FIG. 2 is a schematic diagram of the ion chromatography system in accordance with an embodiment of the present disclosure. Please refer to FIG. 1 and FIG. 2, in the step S01, the sample 11 is loaded into the ion chromatography system 1. In some embodiments, the sample 11 may be, for example, the aqueous solution or extraction liquid taken from semiconductor factories, chemical factories, equipment factories, artificial sewers, and natural environments, here is not intended to be limiting. The sample 11 may have ions, for example, the carbonate ions 1311, the bicarbonate ions 1312, the fluoride ions, the chloride ions, the nitrite ions, the bromide ions, the nitrate ions, the hydrogen phosphate ions, the sulfate ions, the hydrogen ions, and the ammonium ions, or the other corresponding ions that need to be detected. Here is not intended to be limiting. The ion chromatography system 1 is an analysis device that uses ion chromatography (That is, a type of liquid chromatography) to perform qualitative and quantitative analysis of ion components in a solution. In some embodiments, the sample 11 may be placed, injected, or pumped into the ion chromatography system 1 to load the sample 11 into the ion chromatography system 1.

Figure 3:
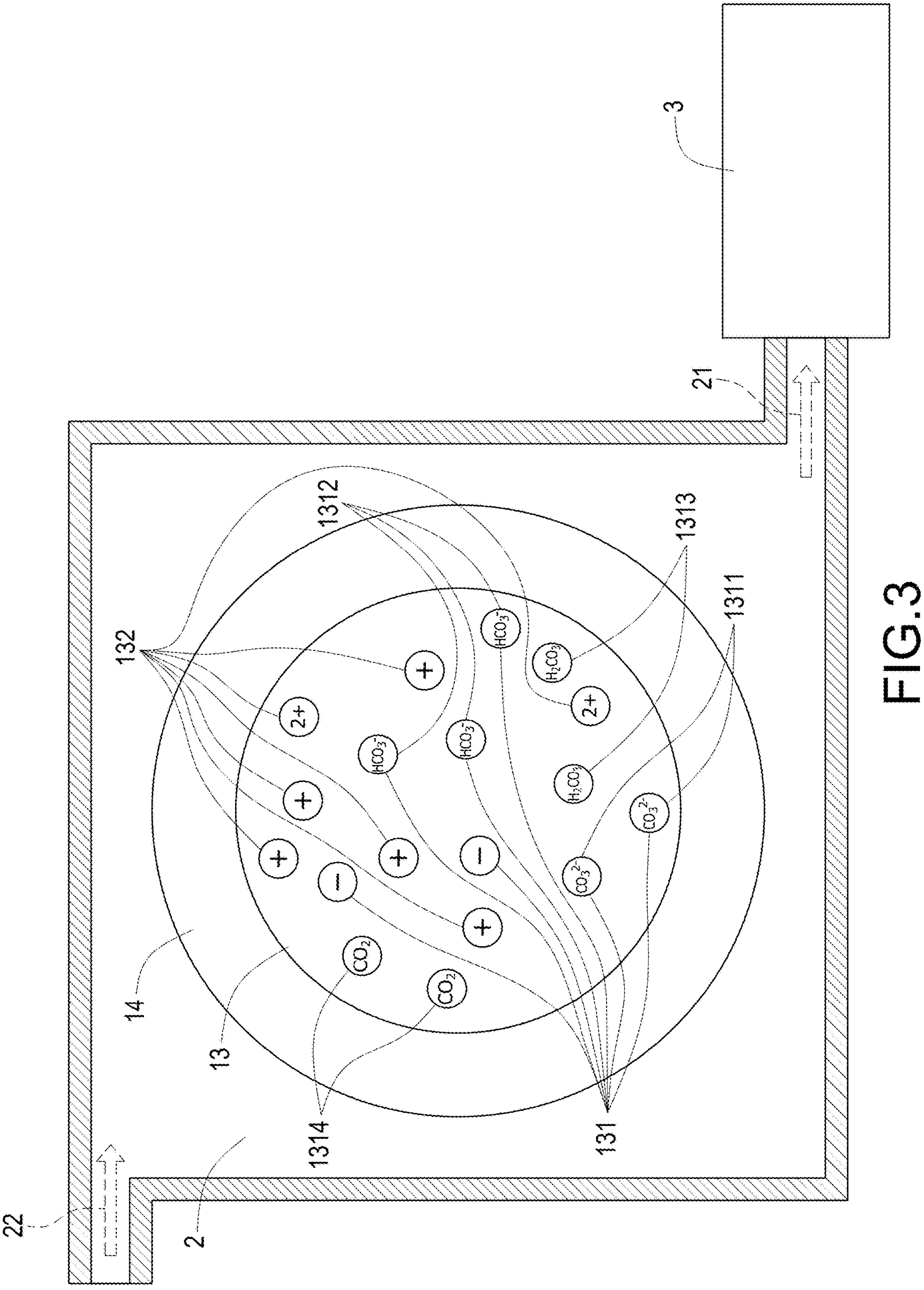
FIG. 3 is a schematic diagram of the gas-permeable membrane in accordance with an embodiment of the present disclosure.

FIG. 3 is a schematic diagram of the gas-permeable membrane in accordance with an embodiment of the present disclosure. Please refer to FIG. 1, FIG. 2, and FIG. 3, in the step S02, the sample 11 is combined with the liquid mobile phase 12 to be the object under test 13. The object under test 13 includes a plurality of target anions 131 and a plurality of cations 132. In some embodiments, since the sample 11 is the aqueous solution, the mobile phase is also selected as the aqueous solution, mainly using diluted acid, alkali, and salt solutions. Here is not intended to be limiting. In some embodiments, trace amounts of water-miscible organic substances, for example, acetone, may be added to the aqueous solution as the mobile phase. The alkaline solution may be, for example, a potassium hydroxide solution, a sodium hydroxide solution, or a sodium bicarbonate solution. Here is not intended to be limiting. After the sample 11 and the liquid mobile phase 12 are mixed, the state of ion dissociation of the sample 11 may be adjusted to form the object under test 13 suitable for the ion chromatography. The object under test 13 mixed by the sample 11 and the liquid mobile phase 12 includes the target anions 131 and the cations 132. The target anions 131 are, for example, the fluoride ions, the chloride ions, the nitrite ions, the bromide ions, the nitrate ions, the hydrogen phosphate ions, and the sulfate ions. The cations 132 are, for example, the hydrogen ions, the potassium ions, the sodium ions, and the ammonium ions. However, the object under test 13 may have anions other than the target anions 131, for example, the carbonate ions 1311, and the bicarbonate ions 1312, which are sources of noise when detecting the target anions 131.

In the step S03, the target anions 131 in the object under test 13 are separated into a plurality of groups. In some embodiments, the different target anions 131 in the object under test 13 are under the different forces in the ion chromatography system 1. After the chromatography is performed for the object under test 13 for a period of time, the different target anions 131 have different retention capacities. As a result, the target anions 131 are separated into a plurality of groups. The target anions 131 are separated into, for example, a group of fluoride ions, a group of chloride ions, a group of nitrite ions, a group of bromide ions, a group of nitrate ions, a group of hydrogen phosphate ions, and a group of sulfate ions. Here is not intended to be limiting.

In the step S04, the cations 132 in the object under test 13 are replaced by a plurality of hydrogen ions. In some embodiments, the hydrogen ions are used to replace the cations 132 in the object under test 13, for example, the potassium ions, the sodium ions, and the ammonium ions. Here is not intended to be limiting. As a result, the interference of the cations 132 on the conductivity detection of the target anions 131 is reduced.

In the step S05, the vacuum environment 2 is created. In some embodiments, the vacuum environment 2, for example, a rough vacuum level of 760 mmHg to 25 mmHg, a medium vacuum level of 25 mmHg to $10^{-3}$ mmHg, a high vacuum level of $10^{-3}$ mmHg to $10^{-9}$ mmHg, or an ultra-high vacuum level of $10^{-9}$ mmHg to $10^{-12}$ mmHg, may be created. In some embodiments, the vacuum environment 2 with the vacuum level of about 50 mmHg may be created. The vacuum level is the value of air pressure in the vacuum environment 2. In some embodiments, under the vacuum environment 2 with the vacuum level of about 50 mmHg, the pumping flow rate 21 may be controlled to be equal to or less than about 10 standard cubic centimeters per minute. The pumping flow rate 21 is, for example, the gas volume discharged from the vacuum pump per unit time or the gas volume discharged from the vacuum environment 2 per unit time. In some embodiments, under the vacuum environment 2 with the vacuum level of about 50 mmHg, an inlet flow rate 22 may be controlled to be equal to or less than about 10 standard cubic centimeters per minute. As a result, under the condition of the pumping flow rate 21 being equal to or less than about 10 standard cubic centimeters per minute, the vacuum environment 2 with the vacuum level of about 50 mmHg may be created. The inlet flow rate 22 is, for example, the volume of gas entering the vacuum environment 2 per unit time. In some embodiments, the inflow carbon dioxide gas to the vacuum environment 2 is reduced by filtering the inflow carbon dioxide gas due to the inlet flow rate 22.

In some embodiments, the vacuum level of the vacuum environment 2 may be measured. Then, the pumping flow rate 21 is adjusted based on the result of measuring the vacuum level of the vacuum environment 2. For example, when the vacuum level is more than 50 mmHg, the pumping flow rate 21 is adjusted downward, and when the vacuum level is less than 50 mmHg, the pumping flow rate 21 is adjusted upward. In some embodiments, an inlet flow rate 22 may be adjusted based on the result of measuring the vacuum level of the vacuum environment 2. For example, when the vacuum level is more than 50 mmHg, the inlet flow rate 22 is adjusted upward, and when the vacuum level is less than 50 mmHg, the inlet flow rate 22 is adjusted downward.

In the step S06, the object under test 13 is imported to the vacuum environment 2. In the step S07, a plurality of carbon dioxide molecules 1314, a plurality of carbonic acid molecules 1313, a plurality of bicarbonate ions 1312, or a plurality of carbonate ions 1311 in the object under test 13 are removed to make a concentration of the carbonate ions 1311 and a concentration of the bicarbonate ions 1312 be equal to or less than about one ppb. According to the principle of chemical equilibrium, when the partial pressure of the carbon dioxide gas is reduced, the carbon dioxide molecules 1314, the carbonic acid molecules 1313, the bicarbonate ions 1312 or the carbonate ions 1311 in the solution may be released. That may be represented by, for example, the reaction formulas 1 to 4:

$$CO_{2(g)} \rightleftharpoons CO_{2(aq)} \qquad \text{Reaction formula 1}$$

$$CO_{2(g)} + H_2O_{(l)} \rightleftharpoons H_2CO_{3(aq)} \qquad \text{Reaction formula 2}$$

$$H_2CO_{3(aq)} \rightleftharpoons H^+_{(aq)} + HCO_3^-{}_{(aq)} \qquad \text{Reaction formula 3}$$

$$HCO_3^-{}_{(aq)} \rightleftharpoons H^+_{(aq)} + CO_3^{2-}{}_{(aq)} \qquad \text{Reaction formula 4}$$

In some embodiments, after the object under test 13 is transmitted to the vacuum environment 2, since the partial pressure of the carbon dioxide gas under the vacuum environment 2 is smaller than the partial pressure of the carbon dioxide gas under normal pressure, according to Le Chatelier's principle of chemical dynamic equilibrium, reaction formulas 1 to 4 react toward the left. The carbon dioxide molecules 1314, the carbonic acid molecules 1313, the bicarbonate ions 1312, or the carbonate ions 1311 in the object under test 13 are released and produce the carbon dioxide gas. As the vacuum environment 2 is continuously kept to be vacuum, the released carbon dioxide gas is excluded. By this cycle, the concentration of the carbon dioxide molecules 1314, the carbonic acid molecules 1313, the bicarbonate ions 1312, or the carbonate ions 1311 in the object under test 13 is reduced.

In the conductivity detection of the anion chromatography system 1, the carbonate ions 1311 and the bicarbonate ions 1312 are anions but not the target anions 131. That may cause the background noise, which is not conducive to the conductivity detection of the sample 11. Therefore, a plurality of carbon dioxide molecules 1314, a plurality of carbonic acid molecules 1313, a plurality of bicarbonate ions 1312, or a plurality of carbonate ions 1311 in the object under test 13 may be removed to make a concentration of the carbonate ions 1311 and a concentration of the bicarbonate ions 1312 be equal to or less than about one ppb. When any target anion 131 at a concentration of more than about one ppb, the ion chromatography system 1 may clearly detect. It should be noted that the concentration is the concentration by weight. That is, when the concentration of the target ions is more than about one ppb, the conductivity of target ions is more than the background noise generated by the carbonate ions 1311 or the bicarbonate ions 1312 during the detection of the ion chromatography system 1. As a result, the target ions may be detected.

In some embodiment, a carbon dioxide gas is removed from the object under test 13 by a gas-permeable membrane 14. The gas-permeable membrane 14 is a non-specific membrane that uses the particle size of molecules to separate molecules of different particle sizes. The gas-permeable membrane 14 allows the passing of the smaller monomer gas molecules in the solution and prevents the passing of all larger molecules. In some instances, the gas-permeable membrane 14 may allow the passing of monomer gases with smaller particle sizes, for example, the carbon dioxide molecules 1314, in the object under test 13, and prevents the passing of liquid molecules with larger particle sizes. In some embodiments, the inner side of the gas-permeable membrane 14 is the object under test 13, and the outer side of the gas-permeable membrane 14 is the vacuum environment 2 with the vacuum level of 50 mmHg. As a result, the carbon dioxide molecules 1314 in the object under test 13 may be discharged from the gas-permeable membrane 14 by pressure difference.

In some embodiments, when the gas-permeable membrane 14 is damaged, a buffer device may prevent the object under test 13 from flowing into a vacuum pump. When the operation is careless or an accident occurs due to force majeure factors during creating the vacuum environment 2, the buffer device may prevent the object under test 13 from flowing into the vacuum pump. As a result, the object under test 13 is avoided to flow into the vacuum pump and cause damage to the vacuum pump.

In some embodiments, a vacuum pump may be controlled to be turned on and turned off by a relay.

Figure 4:
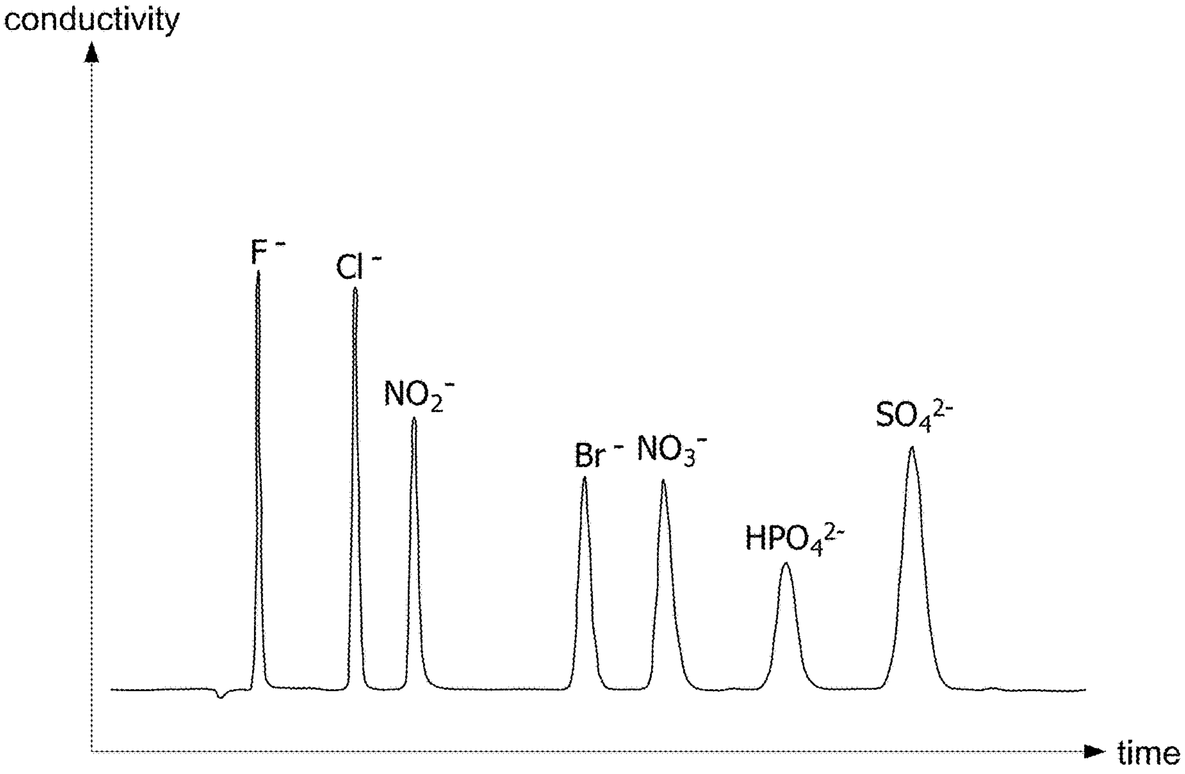
FIG. 4 is a schematic diagram of the conductivity detection result in accordance with an embodiment of the present disclosure.

FIG. 4 is a schematic diagram of the conductivity detection result in accordance with an embodiment of the present disclosure. Please refer to FIG. 4, after the chromatography is performed for the object under test 13 for a period of time, the different target anions 131 have different retention capacities. As a result, the target anions 131 are separated into a plurality of groups. The target anions 131 are separated into, for example, a group of fluoride ions, a group of chloride ions, a group of nitrite ions, a group of bromide ions, a group of nitrate ions, a group of hydrogen phosphate ions, a group of sulfate ions or the other anion groups. Here is not intended to be limiting. Therefore, the conductivity peaks higher than the background noise may be measured at different times. Then, by looking up tables or using standard items, the anions corresponding to the peak value of the conductivity at a specific time may be obtained.

In summary, the related-art of ion chromatography does not remove the carbon dioxide. Therefore, the related-art of ion chromatography may only detect solutions with the concentration of the target ions higher than 1 part per billion (ppb). In semiconductor factories, the extracted solutions under the contaminated ambient air may have a concentration lower than 1 ppb. In this case, the semiconductor manufacturing process may be seriously affected. Furthermore, since the carbon dioxide environmentally contributes to the object under test, the related-art of the ion chromatography may not analyze which anions contaminate the solution. The present disclosure provides the removal method of the carbon dioxide which may make the carbon dioxide molecule, the carbonic acid molecule, the bicarbonate ions, and the carbonate ions in the object under test be released by creating a vacuum environment and transmitting the object under test to the vacuum environment. The carbon dioxide gas may be removed from the object under test by a gas-permeable membrane. An inlet flow rate and a pumping flow rate may be controlled to be equal to or less than about 10 standard cubic centimeters per minute under the vacuum environment with the vacuum level of about 50 mmHg. As a result, the vacuum environment is stably created, and vibration is reduced to provide stable airflow for the carbon dioxide gas flowing in the vacuum environment, which may assist for taking away the carbon dioxide gas. The inflow carbon dioxide gas due to the inlet flow rate may be filtered. As a result, the inflow carbon dioxide gas to the vacuum environment is reduced, and the concentration of the carbon dioxide gas in the vacuum environment is stably controlled. The inlet flow rate may be adjusted based on the result of measuring the vacuum level of the vacuum environment to stably create the vacuum environment. When the gas-permeable membrane is damaged, the object under test may be prevented from flowing into a vacuum pump by a buffer device to avoid damage to the vacuum pump. When the pressure changes instantaneously, the buffer device may reduce the instantaneous pressure difference to protect the gas-permeable membrane. The vacuum pump may be controlled to be turned on and turned off by a relay to enhance operational convenience. The removal method of the carbon dioxide in the disclosure may make a concentration of the carbonate ions and a concentration of the bicarbonate ions be equal to or less than about one ppb. Therefore, when the ion chromatography system detects target ions with a concentration more than about one ppb, the target ions may be detected. The removal method of the carbon dioxide in the disclosure may be applied in semiconductor factories, chemical factories, equipment factories, environmental pollution, and other fields to provide precise chemical analysis.

As used herein and not otherwise defined, the terms "substantially" and "approximately" are used to describe and account for small variations. When used in conjunction with an event or circumstance, the terms may refer to instances in which the event or circumstance occurs precisely as well as instances in which the event or circumstance occurs to a close approximation. For example, when used in conjunction with a numerical value, the terms may refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While this disclosure has been described by means of specific embodiments, numerous modifications and variations may be made thereto by those skilled in the art without departing from the scope and spirit of this disclosure set forth in the claims.

What is claimed is:

1. A removal method of a carbon dioxide, cooperated with an ion chromatography system, the removal method comprising:

loading a sample into the ion chromatography system;

combining the sample with a liquid mobile phase to be an object under test, wherein the object under test comprises a plurality of target anions and a plurality of cations;

separating the target anions in the object under test into a plurality of groups;

replacing the cations in the object under test with a plurality of hydrogen ions;

creating a vacuum environment;

transmitting the object under test to the vacuum environment; and removing a plurality of carbon dioxide molecules, a plurality of carbonic acid molecules, a plurality of bicarbonate ions, or a plurality of carbonate ions in the object under test to make a concentration of the carbonate ions and a concentration of the bicarbonate ions be equal to or less than about one part per billion.

2. The removal method of claim 1, wherein, the creating of the vacuum environment further comprises:

creating the vacuum environment with a vacuum level of about 50 mmHg.

3. The removal method of claim 2, wherein, the creating of the vacuum environment with the vacuum level of about 50 mmHg further comprises:

under the vacuum environment with the vacuum level of about 50 mmHg, controlling a pumping flow rate to be equal to or less than about 10 standard cubic centimeters per minute.

4. The removal method of claim 3, wherein, the controlling of the pumping flow rate to be equal to or less than about 10 standard cubic centimeters/minute further comprises:

controlling an inlet flow rate to be equal to or less than about 10 standard cubic centimeters per minute.

5. The removal method of claim 4, wherein, the controlling of the inlet flow rate to be equal to or less than about 10 standard cubic centimeters per minute further comprises:

filtering a carbon dioxide gas flowing in due to the inlet flow rate.

6. The removal method of claim 1, wherein, the removing of the carbon dioxide molecules, the carbonic acid molecules, the bicarbonate ions, or the carbonate ions in the object under test to make the concentration of the carbonate ions and the concentration of the bicarbonate ions be equal to or less than about one part per billion further comprises:

removing, by a gas-permeable membrane, a carbon dioxide gas from the object under test.

7. The removal method of claim 6, wherein, the removing, by the gas-permeable membrane, of the carbon dioxide gas from the object under test further comprises:

when the gas-permeable membrane is damaged, preventing, by a buffer device, the object under test from flowing into a vacuum pump.

8. The removal method of claim 2, wherein, the creating of the vacuum environment with the vacuum level of about 50 mmHg further comprises:

measuring the vacuum level of the vacuum environment.

9. The removal method of claim 8, wherein, the measuring of the vacuum level of the vacuum environment further comprises:

adjusting a pumping flow rate based on a result of measuring the vacuum level of the vacuum environment.

10. The removal method of claim 9, wherein, the adjusting of the pumping flow rate based on the result of measuring the vacuum level of the vacuum environment further comprises:

adjusting an inlet flow rate based on the result of measuring the vacuum level of the vacuum environment.

11. The removal method of claim 1, further comprising:

controlling, by a relay, a vacuum pump to be turned on and turned off.

* * * * *